UNITED STATES PATENT OFFICE.

CHESTER E. ANDREWS, OF PITTSBURGH, PENNSYLVANIA, ASSIGNOR TO THE SELDEN COMPANY, OF PITTSBURGH, PENNSYLVANIA, A CORPORATION OF DELAWARE.

METHYL-AMINO-ISOPROPYL-BENZENE-SULFONIC ACID AND PROCESS OF MAKING SAME.

1,314,927. Specification of Letters Patent. Patented Sept. 2, 1919.

No Drawing. Application filed September 14, 1917. Serial No. 191,483.

*To all whom it may concern:*

Be it known that I, CHESTER E. ANDREWS, a citizen of the United States, residing at Pittsburgh, in the county of Allegheny and State of Pennsylvania, have invented certain new and useful Improvements in Methyl-Amino-Isopropyl-Benzene-Sulfonic Acid and Processes of Making Same, of which the following is a specification.

The present invention relates to a new chemical substance, 1-methyl-2-amino-4-isopropyl-5-sulfonic acid compound of benzene, or amino cymene sulfonic acid.

In the carrying out of the process comprised in this invention, the compound amino cymene, (which may be produced as in accordance with the process of my copending application Serial No. 191,245, filed September 13, 1917, Case A,) or its sulfate, is treated with an excess of concentrated sulfuric acid, a sulfuric acid of 98% being preferable, or fuming sulfuric acid. The mixture is heated to about 205° C., until a test portion gives no reaction for the free amin, upon making it alkaline. This test may be carried out by adding a test portion to a large quantity of cold water, and if an oily material separates on making alkaline, this shows that the sulfonation is not complete. The process is usually completed, using 98% acid, in about 10 hours.

As preferred proportions which may be employed, I mention about 6 parts of the amin to about 5 parts of sulfuric acid of 98% strength, or an equivalent quantity of fuming sulfuric acid. The reaction mass, which is a solid, is first broken up and dissolved in hot water, with the addition of about 40 parts of caustic soda. This produces a solution of the sodium salt of the sulfonic acid, which may be purified by boiling with bone charcoal or "decolorizing carbon" followed by filtration.

The filtrate is next acidified and cooled and the sulfonic acid is thereby precipitated.

The process produces excellent yields and the purification of the product is shown to be substantially complete when a test portion of the filtrate is found to be colorless.

The sulfonic acid compound is suitable for the manufacture of various other cymene derivatives.

I claim:

1. 1-methyl-2-amino-4-isopropyl-benzene-5-sulfonic acid.

2. A process of making the sulfonic acid derivative of amino cymene, which comprises heating amino cymene with sulfuric acid of not less than about 98% strength until the reaction mass no longer contains uncombined amino cymene, dissolving and neutralizing with an alkali, boiling with charcoal and thereafter again acidifying to precipitate the sulfonic acid.

In testimony whereof I affix my signature.

CHESTER E. ANDREWS.